United States Patent [19]

Canclini

[11] Patent Number: 5,796,545
[45] Date of Patent: Aug. 18, 1998

US005796545A

[54] DEVICE AND METHOD FOR CALIBRATING A TIME CONSTANT OF ONE OR MORE FILTER CIRCUITS

[75] Inventor: Athos Canclini, Santa Clara, Calif.

[73] Assignee: SGS-Thomson Microelectronics, Inc., Carrollton, Tex.

[21] Appl. No.: 484,495

[22] Filed: Jun. 7, 1995

[51] Int. Cl.$^6$ ............................................. G11B 5/596
[52] U.S. Cl. ........................ 360/78.04; 360/75; 327/553
[58] Field of Search .............................. 327/553, 552; 333/17.1; 360/78.04, 75

[56] References Cited

U.S. PATENT DOCUMENTS

| | | | |
|---|---|---|---|
| 4,818,903 | 4/1989 | Kawano | 327/553 |
| 4,851,719 | 7/1989 | Hitomi | 327/553 |
| 5,124,593 | 6/1992 | Michel | 327/554 |
| 5,170,299 | 12/1992 | Moon | 360/78.04 |
| 5,246,479 | 9/1993 | Gami | 360/73.03 |
| 5,258,695 | 11/1993 | Utenick | 360/73.03 |
| 5,297,024 | 3/1994 | Carobolante | 360/78.04 |
| 5,392,456 | 2/1995 | Mitomo | 333/17.1 |
| 5,416,438 | 5/1995 | Shibata | 327/553 |

OTHER PUBLICATIONS

"SSI 32H6230 Servo Motor Driver," Technical Publication from Silicon Systems®, A TDK Group Company, Dec. 1992, pp. 6–87–6–99.

Primary Examiner—Aristotelis M. Psitos
Assistant Examiner—Alan Faber
Attorney, Agent, or Firm—David V. Carlson; Theodore E. Galanthay; Lisa K. Jorgenson

[57] ABSTRACT

A control circuit for providing a stable, adjustable, time constant for use as a master time constant is presented. Used as a master time-constant circuit, this control circuit can ensure multiple slave circuits are precisely calibrated. The circuit includes a charging section that receives a series of calibrating pulses. The reference cell's voltage is compared to a reference voltage equal of Vcc/e. If the cell's voltage is below the reference voltage, a current source charges a capacitor, lowering the resistance of the transistor in the cell to correct the time circuit inaccuracy. Conversely, if the cell's voltage is above the reference voltage, a current sink discharges the capacitor, raising the transistor's resistance. This also corrects the time circuit inaccuracy. Thus, this circuit includes a method to correct time-constants which are too large or too small. This circuit is used in various applications where extreme accuracy and precision is needed, such as media drive read/write heads.

20 Claims, 5 Drawing Sheets

DEVICE AND METHOD FOR CALIBRATING A TIME CONSTANT OF ONE OR MORE FILTER CIRCUITS

TECHNICAL FIELD

The present invention relates generally to electronic circuits and more specifically to a circuit for setting to and maintaining at a desired value a time constant of another circuit.

BACKGROUND OF THE INVENTION

Many of today's electronic devices require a number of their component circuits, such as filters or RCL-type networks, to have accurate pole and zero locations, i.e., time constants. That is, for such an electronic device to operate properly, the transfer functions of the component circuits must meet tight tolerances, i.e., occupy a narrow specified range. For example, to properly position the read-write head of a computer disk drive, the voice-coil controller often requires filters having precise time constants.

A time constant of a circuit is a mathematical expression of a physical relationship between an energy storage element, such as a capacitor or an inductor, and the equivalent impedance that is coupled to it. For example, the time constant of a circuit consisting of one capacitor having capacitance C and one resistor having resistance R equals R×C. Conversely, the time constant of a circuit consisting of one inductor having inductance L and one resistor equals 1/(R×L). In both examples, the bigger the time constant, the lower in frequency the circuit pole and, thus, the slower the circuit.

Variations in the structure and operating environment of the component circuit can, however, cause one or more of its time constants to shift from a desired value or values. For example, when it is part of an integrated device, a component circuit's time constant may vary significantly from a desired value due to variations in the manufacturing process from batch to batch. The time constant may also shift considerably with variations in the temperature of the integrated device.

One technique for maintaining accurate time constants in spite of structure and temperature variations includes using precision, temperature-stable circuit components or elements, such as capacitors and resistors, to construct part or all of the component circuit. Such elements, however, are often considerably more expensive than nonprecision elements. When applied to integrated devices, this technique often entails externally coupling such precision elements to an integrated device to accurately set a time constant of an internal circuit. In addition to increasing the cost of a system using such an integrated device, such precision elements may also increase the printed-circuit-board area of and the design time for the system.

SUMMARY OF THE INVENTION

In accordance with the present invention, a device is provided for maintaining a time constant of a circuit at a first value. The device includes a reference cell that has a reference time constant. A calibrator is coupled to both the cell and the circuit and maintains the reference time constant at a second value and the circuit time constant at the first value.

In one embodiment of the invention, the reference cell includes a capacitive element and a variable resistance that is coupled across the element and has a control terminal coupled to the calibrator.

In another embodiment of the invention, the calibrator compares the reference time constant to a predetermined time period that has essentially the second value, and generates and couples to the cell and the circuit a control voltage that maintains the circuit and reference time constants at the first and second values respectively.

In still another embodiment of the invention, the calibrator compares the reference time constant to a pulse train that has a period essentially equal to the first value, and generates in response to this comparison a control voltage that maintains the circuit and reference time constants at the first and second values respectively.

In yet another embodiment of the invention, the first value is essentially equal to the second value.

An advantage of the invention is that it can maintain the time constant of a component circuit at a desired value without using precision circuit elements.

Another advantage of the invention is that it can be formed as part of an integrated device.

DETAILED DESCRIPTION OF THE INVENTION

Figure 1:
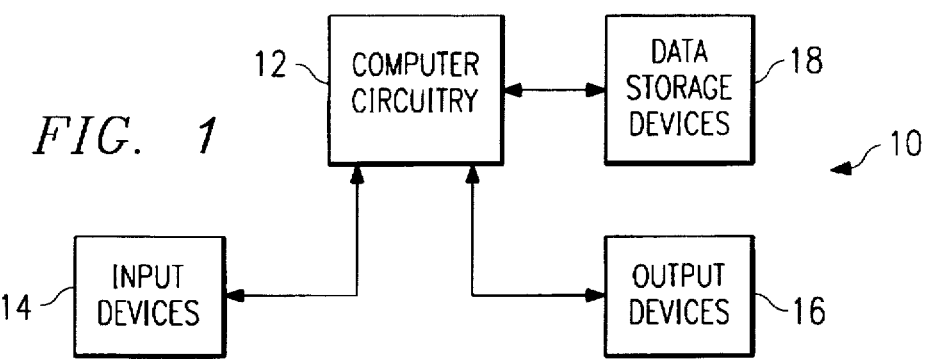
FIG. 1 is a block diagram of a computer system.

FIG. 1 is a block diagram of a computer system 10 according to the present invention. The computer system 10 includes computer circuitry 12 for performing computing functions, such as executing software to perform desired calculations or tasks. The computer circuitry 12 typically includes a processor (not shown). One or more input devices 14, such as a keypad or a mouse, are coupled to the computer circuitry 12 and allow an operator (not shown) to manually input data thereto. One or more output devices 16 are coupled to the computer circuitry 12 and provide to the operator data generated thereby. Examples of output devices 16 include a printer and a video display unit. One or more data storage devices 18 are coupled to the computer circuitry 12 to store data on or retrieve data from external storage media (not shown). Examples of storage devices 18 and storage media for use therewith include drives that accept magnetic media, such as hard disks, floppy disks, and tape cassettes, and drives that accept optical media, such as laser disks and compact-disk read only memories (CD-ROMs).

Figure 2:
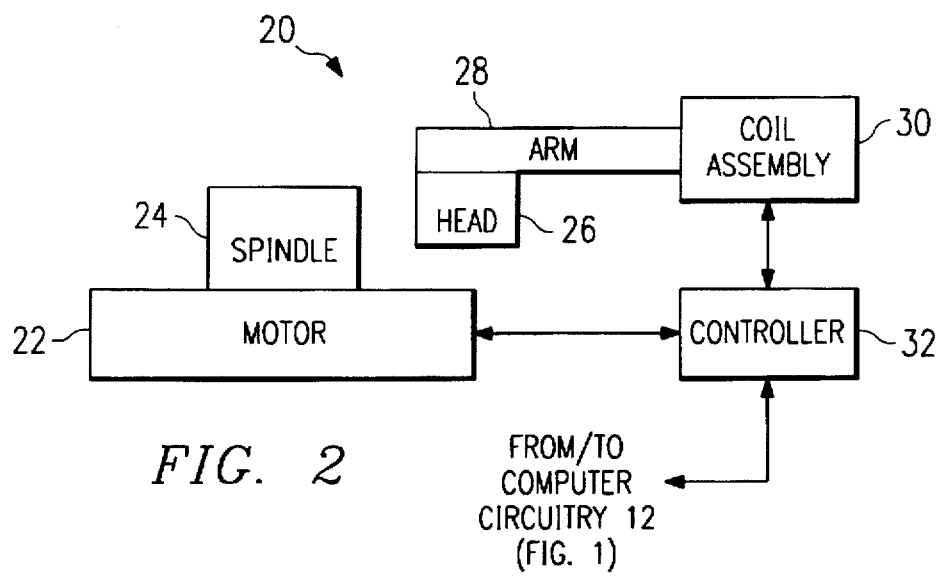
FIG. 2 is a block diagram of one embodiment of a data storage device of FIG. 1.

FIG. 2 is a block diagram of a media drive 20 that can be used as a data storage device 18 of FIG. 1. Drive 20 includes a motor 22 for rotating a spindle 24, which in turn rotates the storage media. In one embodiment of the invention, motor 22 is a brushless direct-current (DC) motor. Media drive 20 also includes a read-write head 26 for reading data from and writing data to the storage media. An arm 28, which is movable within a coil assembly 30, supports head 26. A controller 32, which may be an integrated circuit, controls the motor 22 and the coil assembly 30 in response to control signals received from the computer circuitry 12 of FIG. 1. Media drive 20 may also include other components, such as a housing and a loading mechanism, that are omitted for clarity.

In operation, the controller 32 controls motor 22 to rotate spindle 24 and, thus, the media, at a desired speed. Once motor 22 reaches the desired speed, controller 32 controls coil assembly 30 to move, via arm 28, head 26 adjacent to the radial position, i.e., track, of the storage media that contains the storage location selected to be read from or written to. Thus, coil assembly 30 is similar to a voice coil assembly (not shown) in that by applying appropriate signals thereto, arm 28 can be made to slide a desired distance into or out of the assembly 30. In response to signals from controller 32, head 26 transfers data from the computer circuitry 12 to the selected storage location (write) or transfers data from the selected storage location to the computer circuitry 12 (read).

Figure 3:
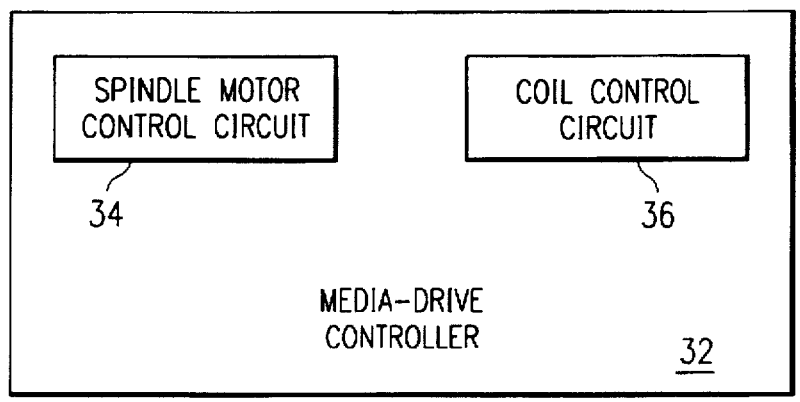
FIG. 3 is a block diagram of one embodiment of the controller of FIG. 2.

FIG. 3 is a block diagram of one embodiment of the media drive controller 32 of FIG. 2. Controller 32 includes a spindle drive control circuit 34 for controlling the spindle motor 22 of FIG. 2, and a coil control circuit 36 for driving the coil assembly 30 of FIG. 2. Controller 32 may be a completely integrated device, formed from discrete electrical components, or be a combination of integrated and discrete components.

Figure 4:
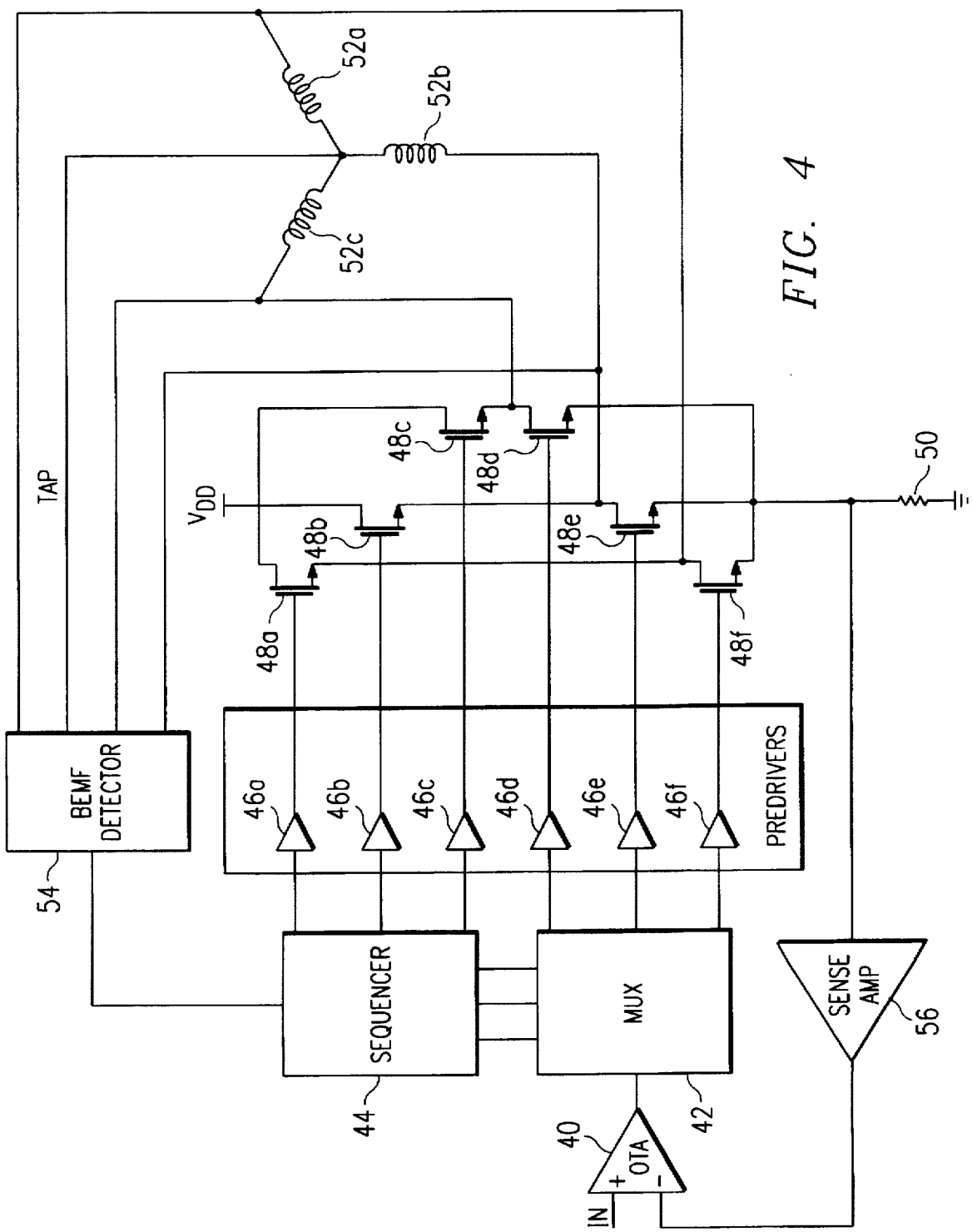
FIG. 4 is a block diagram of one embodiment of the spindle control circuit of FIG. 3.

FIG. 4 is a circuit block diagram of one embodiment of the spindle motor control circuit 34 of FIG. 3. Control circuit 34 includes a differential amplifier 40 that receives an input drive signal at a noninverting terminal and a feedback signal at an inverting terminal. An output terminal of amplifier 40 is coupled to an input terminal of a multiplexer 42, which has a number of control inputs that are coupled to a sequencer 44, and a number of outputs each coupled to a predriver 46. In one embodiment of the invention, multiplexer 42 has three control inputs and three outputs. Predrivers 46 are each coupled to a control input of a power drive transistor 48. Transistors 48 are coupled between a supply voltage $V_{DD}$ and a sense resistor 50. Transistors 48a–c have a current source terminal coupled to motor coils 52a–c respectively, and transistors 48d–f have a current sink terminal coupled to motor coils 52c–a respectively. Each coil-transistor junction is coupled to an input of a back electromagnetic force (BEMF) detector 54. The remaining terminal of each motor coil 52a–c is coupled to a center tap input of detector 54. An output terminal of detector 54 is coupled to sequencer 44, which has a number of outputs each coupled to a corresponding predriver 46. In one embodiment of the invention, the sequencer 44 has three outputs coupled to predrivers 46a–c respectively. Sense resistor 50 is coupled between the input of a sense amplifier 56 and a reference voltage, here ground. Sense amplifier 56 generates at its output the feedback signal that is coupled to the inverting terminal of amplifier 40.

In operation, the computer circuitry 12 or other circuits (not shown) of controller 32 generate the input signal at the voltage appropriate to drive the motor 22 at the appropriate speed. Sequencer 44 determines the sequence in which it and mux 42 in conjunction with predrivers 46 activate transistors 48. Such sequences are known in the art, and therefore are not further discussed. BEMF detector 54 compares the voltage at a selected coil-transistor junction with the center tap voltage, and provides the results of this comparison to sequencer 44. Sequencer 44 uses this comparison information to calculate the transistor-activation sequence. Resistor 50 converts the sum of the currents through transistors 48d–f into a sense voltage, which is amplified by amplifier 56 into the feedback voltage. In one embodiment of the invention, the sense voltage is approximately 100–300 millivolts. Amplifier 40 adjusts its output voltage so as to maintain the feedback voltage essentially equal to the input voltage.

Figure 5:
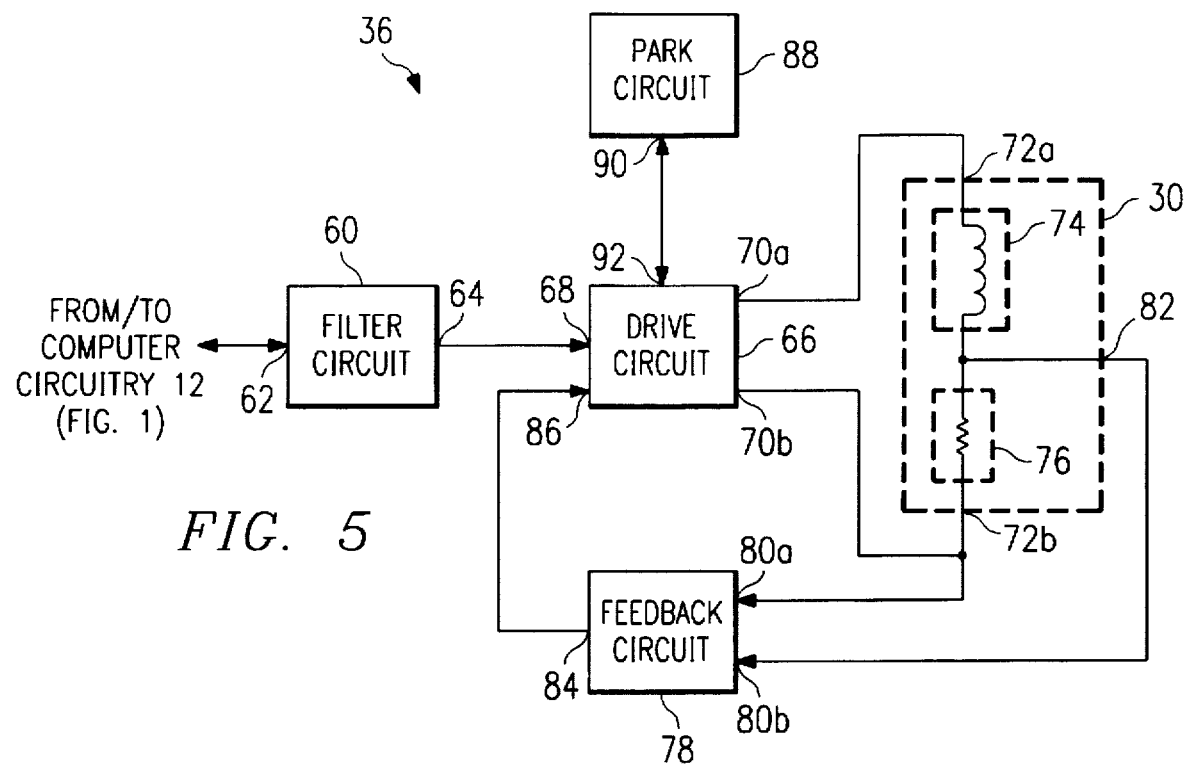
FIG. 5 is a block diagram of one embodiment of the coil controller of FIG. 3.

FIG. 5 is a block diagram of both the coil assembly 30 of FIG. 2 and the coil control circuit 36 of FIG. 3. Coil controller 36 includes a filter circuit 60, which receives a control signal from the computer circuitry 12 of FIG. 1 at an input terminal 62, and filters the control signal to generate a filtered output signal at an output terminal 64. A drive circuit 66 receives the filtered output signal at an input terminal 68 and generates a differential drive signal at output terminals 70a and 70b. The coil assembly 30 includes drive terminals 72a and 72b, which receive the differential drive signal from output terminals 70a and 70b respectively. Coil assembly 30 also includes a coil 74, which in response to the drive signal, generates the magnetic field that moves arm 28 of FIG. 2. Coil 74 and a sense load 76 are serially coupled between drive terminals 72a and 72b. As shown, in one aspect of the invention, sense load 76 is a resistor. A feedback circuit 78 has differential input terminals 80a and 80b respectively coupled to the drive terminal 72b and a feedback terminal 82 of coil assembly 30 such that the differential inputs of the feedback circuit 78 are coupled across the sense load 76. The feedback circuit 78 generates a feedback signal at an output terminal 84, which is coupled to a feedback input terminal 86 of the drive circuit 66. A head park circuit 88 has a terminal 90 coupled to a park terminal 92 of the drive circuit 66. As stated above, the coil control circuit 36 may be formed from integrated components, discrete components, or a combination of both integrated and discrete components.

In operation, the filter circuit 60 receives a head control signal from the computer circuitry 12 of FIG. 1. In one aspect of the invention, the head signal is one or more pulse-with-modulated bits of information. In another aspect of the invention, the control circuit 32 may provide to the computer circuitry 12, via the filter circuit 60, information such as the current position of the head 26. The filter circuit 60 filters the head signal and provides the filtered output signal to the drive circuit 66, which processes the filtered signal and generates the coil drive signal. The feedback circuit 78 receives a sense voltage signal, which equals the product of the current through and the resistance of the sense load 76, and in response thereto generates the feedback signal, which the drive circuit 66 combines with the filtered signal to generate the coil drive signal. Because the general theory and advantages of feedback are well-known, they are not further discussed. In the event of an interruption in the power supply voltage, park circuit 88 signals drive circuit 66 to generate the coil drive signal so as to prevent damage to the head 26 that might otherwise occur if interruption-induced fluctuations in the coil drive signal caused the arm 28 to move erratically.

Figure 6:
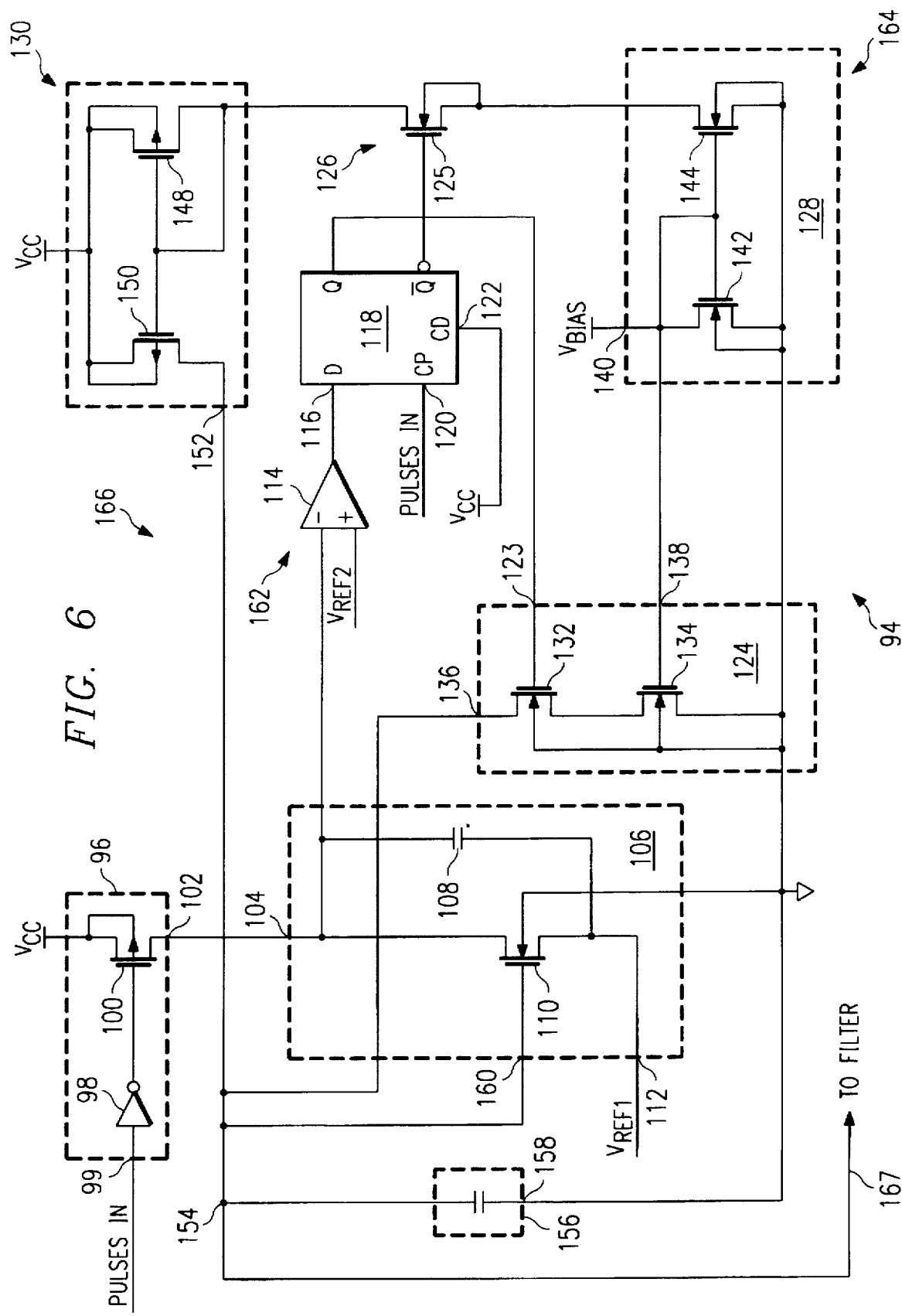
FIG. 6 is a circuit diagram of one embodiment of a time-constant maintenance circuit for the filter circuit of FIG. 5.

FIG. 6 is a circuit diagram of a time-constant maintenance circuit 94 that forms part of the filter circuit 60 of FIG. 5. Circuit 94 includes a charging circuit 96 that includes an inverter 98 coupled as shown to a transistor 100, receives a train of calibrating pulses at an input terminal 99, and generates a charging signal at an output terminal 102. The output terminal 102 is coupled to a charging terminal 104 of a reference cell 106, which includes a capacitive element 108 (here a capacitor) and a variable impedance 110 (here a transistor) coupled in parallel between terminal 104 and a reference terminal 112. A reference voltage $V_{REF1}$ is coupled to terminal 112.

Charging terminal 104 is also coupled to the inverting input of a comparator 114, which has a noninverting input terminal coupled to a reference voltage $V_{REF2}$. An output terminal of comparator 114 is coupled to an input terminal 116 of a D flip flop 118. A clock input 120 receives the calibrating pulses, and an enable input 122 is coupled to supply voltage $V_{CC}$, which represents a logic high. An output Q is coupled to an input terminal 123 of a current source 124, and an output $\overline{Q}$ is coupled to a control terminal 125 of a switch 126 (here a transistor).

Switch 126 is coupled between a current source 128 and a current mirror 130. Current source 124 includes a pair of transistors 132 and 134 coupled as shown, a drive terminal 136, and a control terminal 138, which is coupled to a bias voltage $V_{BIAS}$. Current source 128 includes a control terminal 140 and transistors 142 and 144 coupled as shown. Current mirror 130 includes transistors 148 and 150 coupled to a drive terminal 152.

Both drive terminal 136 of current source 124 and drive terminal 152 of current mirror 146 are coupled to a calibration terminal 154 of a signal storage device 156. Storage device 156 has a reference terminal 158 that is coupled to a reference voltage (here ground). The calibration terminal 154 is also coupled to a time-constant control terminal 160 of reference cell 106.

Together, the comparator 114 and flip flop 118 form a comparator circuit 162, and the switch 126, current sources 124 and 128, current mirror 130, and signal storage device 156, form a calibration-signal generator 164. Together, the comparator circuit 162 and calibration-signal generator 164 form a calibration circuit 166.

In one embodiment of the invention, the width-to-length ratios of transistors 100, 110, 126, 132, 134, 142, 144, 148, and 150 are 50 microns\1.2 microns, 3.4\350, 60/1.2, 100\1.2, 3.4\1.2, 200\1.2, 20\1.2, 40\1.2, and 5\1.2, respectively, and the values of capacitors 108 and 110 are 5 and 35 picofarads, respectively.

In operation, the calibration pulses each have a pulse width that is significantly smaller than the period between successive pulses, which is essentially equal to the time constant desired for reference cell 106. Typically, a circuit such as a monostable multivibrator (not shown) derives the pulses from a precise system clock, which is typically generated by a crystal circuit (not shown). Suitable multivibrators and crystal circuits are known in the art, and, therefore, are not further discussed. When a positive-going pulse is input to inverter 98, transistor 100, which acts like a switch, closes to create a low impedance path between $V_{CC}$ and charge terminal 104. This path allows capacitor 108 to charge to essentially $V_{CC}$, which in one embodiment of the invention is 5 volts. At the end of the pulse, transistor 100 opens, and the charge on capacitor 108 begins to dissipate through the resistor formed by transistor 110.

Comparator 114 compares the voltage across reference cell 106 with a reference voltage $V_{REF2}$, which essentially equals the voltage to which cell 106 would discharge to after the elapse of one desired time constant, i.e., the period between consecutive input pulses. Thus, $V_{REF2}$ is essentially equal to the initial voltage to which cell 106 is charge divided by the number e, which equals approximately 2.718. Thus, for $V_{CC}$=5 volts, $V_{REF2}$ is approximately equal to 1.8 volts.

At the occurrence of the next pulse, which is essentially one desired time constant after the charging of the reference cell 106, flip flop 118 latches the output of comparator 114 to outputs Q and $\overline{Q}$. For example, if the voltage across the cell 106 discharged to a value that was greater than $V_{REF2}$, then comparator 114 outputs a logic 0. Conversely, if cell 106 discharges to a voltage that is less than $V_{REF2}$, the comparator 114 outputs a logic 1. Thus, when the comparator 114 outputs a logic 0, then the time constant of the cell 106 is longer than the desired time constant, and when the comparator 114 outputs a logic 1, the reference time constant is shorter than the desired time constant.

If the output of the comparator 114 is a logic 0, then the output Q is a logic 0 and the output $\overline{Q}$ is a logic 1. The logic 0 on the output Q turns off current source 124, and the logic 1 at the output $\overline{Q}$ closes transistor 126, which here acts like a switch, and thus allows a current to flow from current source 128 to current mirror 130. A current proportional to that flowing through switch 126 is mirrored at output terminal 152, which sources current to capacitor 156. This sources current charges capacitor 156 and thus increases the voltage at terminal 154. This higher voltage, which is coupled to the gate of transistor 110, reduces the resistance of transistor 110 and thus lowers the time constant of the reference cell 106. Thus, when the time constant of the cell 106 is longer than the desired time constant, calibration circuit 166 acts to shorten the reference time constant and drive it towards the desired time constant.

Conversely, when the output of the comparator 114 is a logic 1, the output Q is a logic 1 and the output $\overline{Q}$ is a logic 0. The logic 0 at the output $\overline{Q}$ shuts off switch 126 so that the current mirror 130 sources no current from terminal 152. The logic 1 at the output Q turns on transistor 132, which here acts as a switch, and allows a current, which is set by transistor 134, to flow from capacitor 156 into terminal 136. Thus, current source 124 sinks current from terminal 154, discharges capacitor 156, and decreases the voltage at terminal 154. This lower voltage increases the resistance of transistor 110, and thus increases the time constant of the reference cell 106. Therefore, when the time constant of the cell 106 is shorter than the desired time constant, calibration circuit 166 acts to lengthen the reference time constant and drive it towards the desired time constant.

Therefore, the feedback loop formed by the calibration circuit 166 maintains the reference time constant essentially equal to the desired time constant. If the reference time constant becomes substantially unequal to the desired time constant, the calibration circuit 166 drives the reference time constant toward the desired time constant until the two time constants are essentially equal. Using known feedback techniques, the calibration circuit 166 is designed in a stable fashion to prevent oscillation of the reference time constant.

As discussed below in conjunction with FIG. 7, calibration terminal 154 is also coupled to a filter 168. Thus, time-constant maintenance circuit 94 acts as a master circuit that maintains the time constants of one or more slave circuits proportional to or equal to the desired time constant.

Figure 7:
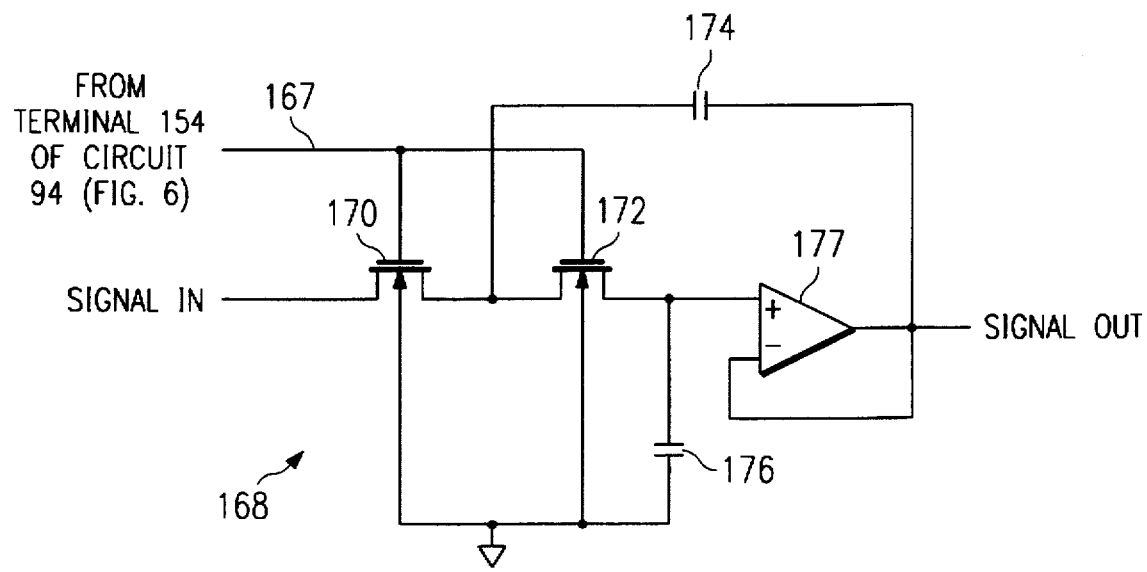
FIG. 7 is a circuit diagram of one embodiment of a filter for the filter circuit of FIG. 5.

FIG. 7 is a circuit diagram of a filter 168 that may form part of filter circuit 60. As shown, filter 168 includes a pair of transistors 170 and 172 having their gates coupled to a calibration line 167, and a pair of capacitors 174 and 176. An amplifier 177 is coupled in a unity-gain configuration as shown. In one embodiment of the invention, the width-to-length ratios of transistors 170 and 172 are both 3.4 microns\38 microns, and the values of capacitors 174 and 176 are 75 and 30 picofarads, respectively.

In operation, the filter 168 filters a signal input to transistor 170. The input signal may be the head control signal from the computer circuitry 12 of FIG. 1, or any other signal that needs filtering. As discussed above in conjunction with transistor 110 of FIG. 6, transistors 170 and 172 act as variable resistors, the resistances of which are controlled by the calibration signal on the calibration line 167. Thus, the calibration signal from circuit 94 of FIG. 6 controls the time constants of filter 168. Depending upon the dimensions of transistors 170 and 172 and the values of capacitors 174 and 176, the circuit 94, in addition to maintaining the reference time constant essentially equal to the desired value (the time between successive pulses of the circuit 94 input signal), maintains the time constants of filter 168 either equal or proportional to the reference time constant, i.e., the desired value. By knowing the proportional relationship between the filter 168 time constants and the reference time constant, circuit 94 maintains the filter time constants at their desired values by maintaining the reference time constant at its desired value.

Figure 8:
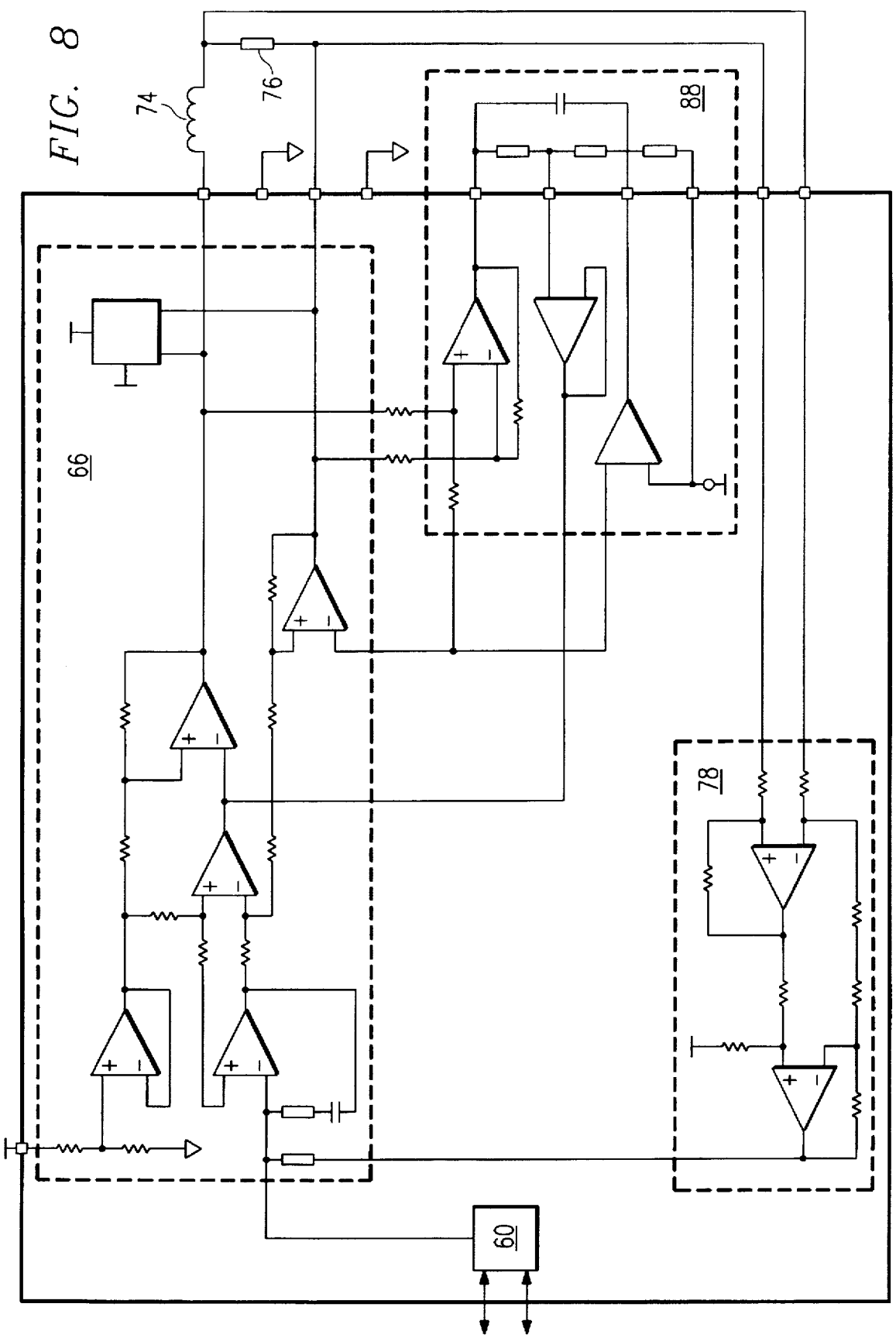
FIG. 8 is a circuit diagram of the coil control circuit of FIG. 5.

FIG. 8 is a circuit diagram of one embodiment of the coil control circuit 36 of FIG. 5. Except for filter 60, coil 74, and sense load 76, dashed lines enclose the circuitry associated with each of the blocks 66, 78 and 88 of FIG. 5.

From the foregoing, it will be appreciated that specific embodiments of the invention have been described herein for purposes of illustration, various modifications may be made without departing from the spirit and scope of the invention. For example, although shown as field effect transistors, some or all of the transistors of the time constant maintenance circuit 94 and the filter 168 may be bipolar transistors.

I claim:

1. A device for maintaining at a desired value a time constant of a circuit having a calibration terminal, comprising:

a reference cell having a reference time constant, a charge terminal, and a reference control terminal;

a charging circuit coupled to receive a calibration signal and coupled to said charge terminal;

a calibration circuit having an input terminal coupled to said charge terminal, a clock terminal coupled to receive said calibration signal, and a calibration terminal that carries a time-constant calibration signal and is coupled to said control terminal;

a comparator having a first input terminal coupled to said charge terminal, a second input terminal coupled to a reference voltage, and a comparator output terminal;

a bistable circuit having an input terminal coupled to said comparator output terminal, a clock terminal coupled to receive said calibration signal, and first and second complementary output terminals;

a signal storage circuit having an output terminal coupled to said control terminal;

a current sourcing circuit coupled between said first output terminal and said storage-circuit output terminal; and a current sinking circuit coupled between said second output terminal and said storage-circuit output terminal.

2. The device of claim 1 wherein said reference cell further comprises:

charge storage circuit; and a variable impedance coupled in parallel with said charge storage circuit and having an adjust terminal coupled to said control terminal.

3. The device of claim 1 wherein said reference cell further comprises:

a capacitor; and a transistor shunting said capacitor and having a control input coupled to said control terminal.

4. The device of claim 1 wherein said charging circuit comprises a switch coupled between a power source and said charge terminal and a control input coupled to said calibration signal.

5. The device of claim 1 wherein said calibration circuit further comprises:

a comparator circuit having a first input terminal coupled to said charge terminal, a second input terminal coupled to a reference voltage, and an output terminal; and a calibration-signal generator having an input terminal coupled to said comparator-circuit output terminal and an output terminal coupled to said calibration terminal.

6. A device for maintaining at a desired value a time constant of a circuit having a calibration terminal, comprising:

a reference cell having a reference time constant, a charge terminal, and a reference control terminal;

a charging circuit coupled to receive a calibration signal and coupled to said charge terminal;

a calibration circuit having an input terminal coupled to said charge terminal, a clock terminal coupled to receive said calibration signal, and a calibration terminal that carries a time-constant calibration signal and is coupled to said control terminal;

a comparator having a first input terminal coupled to said charge terminal, a second input terminal coupled to a reference voltage, and a comparator output terminal;

a flip flop having an input terminal coupled to said comparator output terminal, a clock terminal coupled to said calibration signal, and first and second complementary output terminals;

a voltage storage circuit having an output terminal coupled to said control terminal;

a current source coupled between said first output terminal and said storage-circuit output terminal; and a current sink coupled between said second output terminal and said storage-circuit output terminal.

7. The device of claim 6 wherein said reference cell further comprises:

a charge storage circuit; and a variable impedance coupled in parallel with said charge storage circuit and having an adjust terminal coupled to said control terminal.

8. The device of claim 6 wherein said reference cell further comprises:

a capacitor; and a transistor shunting said capacitor and having a control input coupled to said control terminal.

9. The device of claim 6 wherein said charging circuit comprises a switch coupled between a power source and said charge terminal and a control input coupled to said calibration signal.

10. The device of claim 6 wherein said calibration circuit further comprises:

a comparator circuit having a first input terminal coupled to said charge terminal, a second input terminal coupled to a reference voltage, and an output terminal; and a calibration-signal generator having an input terminal coupled to said comparator-circuit output terminal and an output terminal coupled to said calibration terminal.

11. A drive circuit for controlling a media drive having a spindle driven by a motor and a head controlled by a position signal and driven by a coil that is serially coupled to a sense resistor, comprising:

a spindle controller coupled to said motor; and a head controller coupled to said coil, comprising, a drive circuit having an input terminal and a pair of drive terminals coupled across said serial combination of said coil and sense resistor, a feedback circuit having a pair of input terminals coupled across said sense resistor and an output terminal coupled to said drive-circuit input terminal, and a filter circuit coupled between said position signal and said drive-circuit input terminal, comprising, one or more filters each having a time constant and a time-constant control terminal, a reference circuit having a reference time constant, a charge terminal, and a reference control terminal, a charging circuit coupled to receive a calibration signal and coupled to said charge terminal, a calibration circuit that has an input terminal coupled to said charge terminal, a clock terminal coupled to said calibration signal, a calibration terminal that carries a time-constant calibration signal and is coupled to receive said reference and time-constant control terminals, a comparator having a first input terminal coupled to said charge terminal, a second input terminal coupled to a reference voltage, and a comparator output terminal, a bistable circuit having an input terminal coupled to said comparator output terminal, a clock terminal coupled to receive said calibration signal, and first and second complementary output terminals, a signal storage device having an output terminal coupled to said control terminal, a current sourcing circuit coupled between said first output terminal and said storage-device output terminal, and a current sinking circuit coupled between said second output terminal and said storage-device output terminal.

12. The drive circuit of claim 11 wherein said reference circuit further comprises:

a charge storage device; and a variable impedance coupled in parallel with said charge storage device and having an impedance control terminal coupled to said reference control terminal.

13. The drive circuit of claim 11 wherein said calibration circuit further comprises:

a comparator circuit having a first input terminal coupled to said charge terminal, a second input terminal coupled to a reference voltage, and an output terminal; and a calibration-signal generator having an input terminal coupled to said comparator-circuit output terminal and an output terminal coupled to said calibration terminal.

14. A media drive, comprising:

a spindle operable to hold said media;

a motor operable to rotate said spindle;

a head operable to read data from and write data to said media;

a coil operable to move said head relative to said media;

a sense resistor serially coupled to said coil;

a spindle circuit operable to control said motor; and a head circuit operable to drive said coil in response to a head position signal, comprising, a drive circuit having an input terminal, and a pair of drive terminals coupled across said serial combination of said coil and sense resistors, a feedback circuit having a pair of input terminals coupled across said sense resistor and an output terminal coupled to said drive-circuit input terminal, and a filter circuit coupled to receive said position signal and coupled to said drive-circuit input terminal, comprising, one or more filters each having a time constant and a time-constant control terminal, a reference circuit having a reference time constant, a charge terminal, and a reference control terminal, a charging circuit coupled to receive a calibration signal and coupled to said charge terminal, and a calibration circuit that has an input terminal coupled to said charge terminal, a clock terminal coupled to receive said calibration signal, a calibration terminal that carries a time-constant calibration signal and is coupled to said reference and time constant control terminals, a comparator circuit having a first input terminal coupled to said charge terminal a second input terminal coupled to a reference voltage, and an output terminal, a bistable circuit having an input terminal coupled to said comparator output terminal, a clock terminal coupled to said calibration signal, and first and second complementary output terminals, a signal storage device having an output terminal coupled to said control terminal, a current sourcing circuit coupled between said first output terminal and said storage-device output terminal, and a current sinking circuit coupled between said second output terminal and said storage-device output terminal.

15. The drive circuit of claim 14 wherein said reference circuit further comprises:

charge storage device; and a variable impedance coupled in parallel with said charge storage device and having an impedance control terminal coupled to said reference control terminal.

16. A computer system, comprising: computing circuitry;

a data input device coupled to said computing circuitry;

a data output device coupled to said computing circuitry;

a media drive coupled to said computing circuitry, comprising, a spindle;

a motor coupled to said spindle;

a media read-write head having a drive coil serially coupled to a sense resistor;

a motor control circuit coupled to said motor; and a media read-write head control circuit coupled having an input coupled to a position signal and an output coupled to said coil, comprising, a drive circuit having an input terminal, and a pair of drive terminals coupled across said serial combination of said coil and sense resistor, a feedback circuit having a pair of input terminals coupled across said sense resistor and an output terminal coupled to said drive-circuit input terminal, and a filter circuit coupled between said position signal and said drive-circuit input terminal, comprising,
- one or more filters each having a time constant and a time-constant control terminal,
- a reference circuit having a reference time constant, a charge terminal, and a reference control terminal,
- a charging circuit coupled between a calibration signal and said charge terminal, and
- a calibration circuit that has
  - an input terminal coupled to said charge terminals,
  - a clock terminal coupled to said calibration signal,
  - a calibration terminal that carries a time-constant calibration signal and is coupled to said reference and time-constant control terminals,
  - a comparator having a first input terminal coupled to said charge terminal, a second input terminal coupled to a reference voltage, and a comparator output terminal,
  - a bistable circuit having an input terminal coupled to said comparator output terminal, a clock terminal coupled to said calibration signal, and first and second complementary output terminals,
  - a signal storage device having an output terminal coupled to said control terminal,
  - a current sourcing circuit coupled between said first output terminal and said storage-device output terminal, and
  - a current sinking circuit coupled between said second output terminal and said storage-device output terminal.

17. The computer system of claim 16 wherein said reference circuit comprises:
   a capacitive element; and
   a device coupled across said element and operable to have its impedance controlled by said calibration signal.

18. The computer system of claim 16 wherein said calibration circuit is operable to compare said reference time constant to a predetermined time period having essentially a first value and to generate and couple to said circuit and at least one said filter a control voltage that maintains said reference time constant at said first value and maintains said filter time constants at a second value.

19. The computer system of claim 18 wherein said first value is essentially equal to said second value.

20. The computer system of claim 16 wherein said calibration circuit is further operable to compare said reference time constant to a stable pulse train having a period essentially equal to a first value and to generate in response to said comparison a control voltage that maintains said reference time constant at said first value and maintains said filter time constants at a second value.

* * * * *